United States Patent [19]

Moriyasu et al.

[11] Patent Number: 4,873,417

[45] Date of Patent: Oct. 10, 1989

[54] LASER MACHINING APPARATUS

[75] Inventors: Masaharu Moriyasu; Takeshi Morita; Megumi Ohmine, all of Hyogo, Japan

[73] Assignee: Mitsubishi Denki Kabushiki Kaisha, Tokyo, Japan

[21] Appl. No.: 137,690

[22] Filed: Dec. 24, 1987

[30] Foreign Application Priority Data

Dec. 26, 1986 [JP] Japan ................... 61-308382
Dec. 26, 1986 [JP] Japan ................... 61-308384

[51] Int. Cl.⁴ ............................................ B23K 26/00
[52] U.S. Cl. ........................ 219/121.6; 219/121.63; 219/121.76; 219/121.67
[58] Field of Search ...... 219/121 C, 121 CS, 121 LT, 219/121 LA, 121 CB, 121 LG, 121 LN, 121 LC, 121 LD, 121 LQ

[56] References Cited

U.S. PATENT DOCUMENTS 4,408,602 10/1983 Nakajima ................ 128/303.1
4,503,854 3/1985 Juko ...................... 128/303.1
4,573,465 3/1986 Sugiyama et al. ......... 219/121.76 X
4,613,206 9/1986 Franchetti et al. ....... 219/121.74 X
4,701,591 10/1987 Masaki et al. ........... 219/121 LA X
4,728,773 3/1988 Roberts et al. ......... 219/121 LT Primary Examiner—C. L. Albritton
Attorney, Agent, or Firm—Sughrue, Mion, Zinn, Macpeak & Seas

[57] ABSTRACT

A plurality of different laser oscillators are optically connected through respective first laser beam transmission paths to a corresponding number of machining stations. The first laser beam transmission paths are mutually connected optically through laser beam converters and second laser beam transmission paths and the second laser beam transmission paths may be optically connected through laser beam branching devices to a common laser beam transmission path which is optically connected through laser beam branching devices and third laser beam transmission paths to the machining stations, respectively, so that, by suitably controlling the laser beam converters and the laser beam branching devices, a workpiece in one of the machining stations can be machined in various manner with any or any combination of laser beams generated by the laser oscillators.

9 Claims, 7 Drawing Sheets

LASER MACHINING APPARATUS

BACKGROUND OF THE INVENTION

The present invention relates to a laser machining apparatus capable of performing various machinings of workpiece efficiently by using any one or a combination of different laser beams.

FIG. 1 shows a construction of an example of a conventional laser machining apparatus which is disclosed in the joint research and development report in "composite Manufacturing System using Super High Performance Laser", Large Scale Project sponsored by Agency of Industrial Science and Technology of Japan. In FIG. 1, a reference numeral 1 depicts a $CO_2$ laser ocsillator having an output power of 10 KW, 2 a console of the oscillator 1, 3 a 5 KW laser machining mechanism, which is provided with a pair of machining heads for welding and tempering, 4 a control device for the welding head, 5 a control device for the tempering head and 6 a 10 KW laser machining mechanism. Reference numerals 7 and 8 depict a control panel and a console of the laser machining mechanism 6. A reference numeral 9 depicts a laser machining managing device for managing whole of the laser machining apparatus, 10 a center post having a switch mechanism for switching the laser beam produced by the laser oscillator 1 between the laser machining mechanisms 3 and 6, and 11 an optical path control device responsive to a control signal from the laser machining managing device 9 for controlling the center post 10. Laser beam transmission paths are depicted by 3a and 6a.

In the conventional laser machining apparatus constructed as above, a laser beam derived from the $CO_2$ laser oscillator 1 is branched at the center post 10 and transmitted through the optical paths 3a and 6a to the laser machining mechanisms 3 and 6 in a time sharing manner to realize time shared welding and tempering operations thereby, so that a workpiece can be welded and tempered successively. Therefore, when it is desired to perform other work than welding and tempering, such as, for example, cutting another machine which has a laser oscillator having an output power sufficient to cut the workpiece has to be prepared. An example of such a laser oscillator may be a $TEM_{oo}$ mode laser whose output power is as small as 1 KW and whose condensation performance is excellent.

In Japanese patent application Laid-Open No. 293694/1986, laser beams from a plurality of laser oscillators are delivered by controllable reflection mirrors to different machining tables so that time loss at respective tables is minimized. In this prior art, it is impossible to perform different machinings of a workpiece by using laser beams having different output powers and/or different wavelengths while the latter stays at a table.

SUMMARY OF THE INVENTION

An object of the present invention is to provide a laser machining apparatus in which any one or a combination of a variety of laser beams can be selected arbitrarily to perform a variety of machinings of a workpiece while it is in a machining station.

According to one aspect of the present invention, the laser machining apparatus comprises a plurality of laser oscillators, each having a different output power and connected through a different one of a plurality of first laser beam transmission paths to a different one of a plurality of machining stations, a plurality of second laser beam transmission paths each connecting adjacent ones of the first laser beam transmission paths to each other and a plurality of controllable laser beam converters each disposed at each of coupling portions between the first laser beam transmission path and the second laser beam transmission path.

According to another aspect of the present invention, a common laser beam transmission path and a plurality of third laser beam transmission paths are provided additionally. The common laser beam transmission path connects between the second laser beam transmission paths and the third laser beam transmission paths extends from respective junctions between the third and the second laser beam transmission paths to respective machining stations. At each of the junctions a controllable laser beam branching device is provided to determine optical paths for the laser beams.

With the above mentioned construction of the present invention, any of the laser beams from the laser oscillators having different output powers can be selected arbitrarily by an associated one of the laser beam converters and guided to a desired laser machining mechanism. Therefore, various workings for a workpiece can be performed.

DETAILED DESCRIPTION OF THE PREFERRED EMBODIMENT

Figure 1:
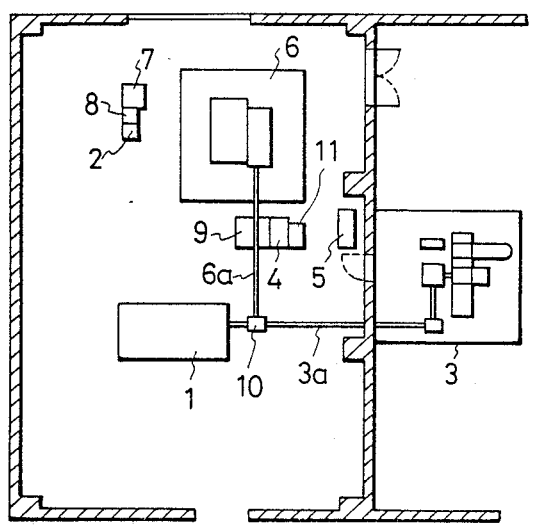
FIG. 1 shows a construction of an example of a conventional laser beam machining apparatus.
Figure 2:
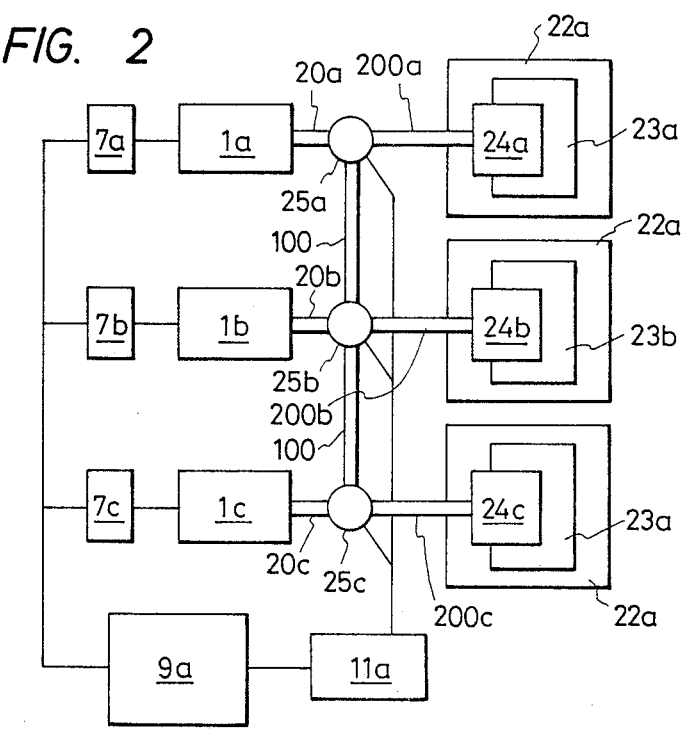
FIG. 2 shows a construction of a laser beam machining apparatus according to an embodiment of the present invention.

In FIG. 2 which shows a construction of an embodiment of the present invention, a laser oscillator 1a is a $CO_2$ laser having an output power as large as 5 KW, a laser oscillator 1b is a single mode $CO_2$ pulse laser and a laser oscillator 1c is a continuously excited Q switch YAG pulse laser. One, two or more than two laser beams from each laser oscillator are supplied to each of machining stations 22a, 22b and 22c. On the machining stations, machining tables 23a, 23b and 23c are mounted, respectively, on which workpieces are to be machined. The machining tables 23a, 23b and 23c are equipped with laser machining mechanisms 24a, 24 band 24c, respectively. Each of the laser machining mechanisms comprises a plurality of machining heads, one of which is selected according to a specific machining operation to be performed for a given workpiece and a given time. One of first laser beam transmission paths each composed of a first portion, for example, 20a and a second portion, for example, 200a connects the laser oscillator 1a to the machining station 22a, another of the first laser beam transmission paths, 20b and 200b, connects the laser oscillator 1b to the machining station 22b and a further of the first laser beam transmission paths, 20c and 200c, connects the laser oscillator 1c to the machining station 22c. That is, each laser oscillator, for example, 1a, an associated one of the first laser beam transmission paths, 20a and 200a, and an associated one of the machining stations, 22a, constitute one of the three, parallel arranged laser machining portions.

A reference numeral 100 depicts a second laser beam transmission path which is orthogonal to the first laser beam transmission paths and connects adjacent ones of the first transmission paths to each other through laser beam converters 25a, 25b and 25c, each provided at a respective junction between the first and second laser beam transmission paths. The laser beam converter functions to pass-through or reflect a laser beam from a particular laser oscillator. The laser beam converters 25a, 25b and 25c are controlled by an optical system controller 11a and the laser oscillators 1a, 1b and 1c are controlled by laser oscillator controllers 7a, 7b and 7c, respectively. The optical system controller 11a and the laser oscillator controllers 7a, 7b and 7c are controlled by a laser machining managing device 9a.

In operations, the managing device 9a selects laser beams to be used for machining a workpiece and instructs the optical system controller 11a with respect to one or more of the laser beams selected thereby. The laser oscillator or oscillators generate laser beams as instructed by the managing device 9a through the laser oscillator controller 7a, 7b and 7c the beams being guided through the associated laser beam converters to desired laser beam transmission paths and hence to the laser machining mechanisms of desired machining stations to perform the desired machinings of the workpiece.

When only the high power $C_2$ laser oscillator 1a of 5 KW is used, it is possible to perform various machinings including welding, surface improvements of metal such as tempering, cladding and chilling and metal bending. When the single mode $CO_2$ pulse laser oscillator 1b is solely used, it is possible to perform cutting and/or drilling of various materials and terminal processing of wiring. In a case of the continuously excited, Q switch YAG pulse laser oscillator 1c, it is possible to perform soldering, trimming and/or marking. By combining these laser oscillators, it is possible to perform desired machinings.

Figure 3:
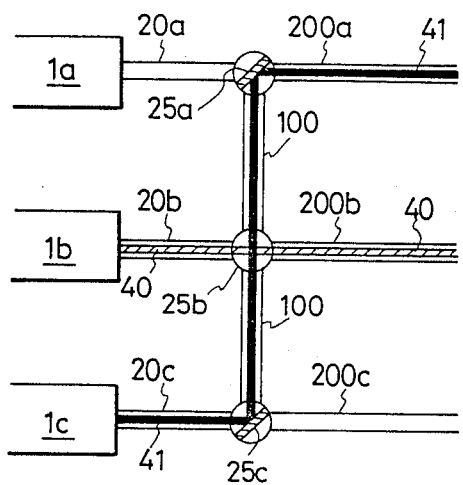
FIG. 3 illustrates an operation of the embodiment of the present invention shown in FIG. 2.

FIG. 3 illustrates an operation of the embodiment of the present invention shown in FIG. 2. In FIG. 3, the laser beam converters 25a and 25c comprises reflection mirrors of gallium arsenide, respectively, and laser beams generated by the singe mode $CO_2$ pulse laser oscillator 1b and the continuously excited, Q switch YAG pulse laser oscillator 1c are depicted by reference numerals 40 and 41, respectively. As shown in FIG. 3, laser beam 40 passes through the first portion 20b of the first laser beam transmission path and the laser beam converter 25b to the second portion 200b of the first laser beam transmission path and then to the machining station 22b to machine the workpiece. Laser beam 41, on the other hand, passes through the first portion 20c of the first laser beam transmission path and is reflected by a rotatable reflection mirror provided in the laser beam converter 25c. The reflected laser beam passes through the second laser beam transmission path 100 and is reflected by a reflection mirror provided in the laser beam converter 25a to the second portion 200a of the first laser beam transmission path and then to the machining station 22a to machine another workpiece.

Figure 4:
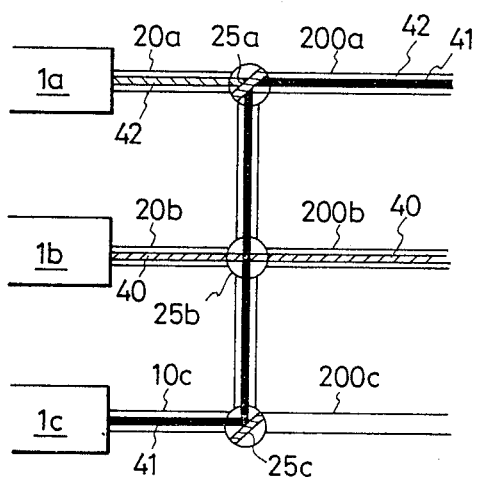
FIG. 4 illustrates another operation of the embodiment of the present invention shown in FIG. 2.

FIG. 4 illustrates another operation of the embodiment shown in FIG. 2, in which laser beams 40 and 41 generated by the single mode $CO_2$ pulse laser oscillator 1b and the continuous excited Q switch YAG pulse laser oscillator 1c are transmitted through the same laser beam transmission paths as those shown in FIG. 3 to the machining stations 22b and 22a, respectively. In FIG. 4, however, since laser beam 42 from the $CO_2$ laser oscillator 1a passes through the reflection mirror of the laser beam converter 25a, the machining station 22a is supplied with both laser beams 42 and 41, the latter beam being from the YAG laser oscillator 1c. In this manner, each machining station can be supplied with any combination of laser beams. Therefore, various machinings can be performed in each machining station.

Although the present invention has been described as having three laser oscillators, the number of the laser oscillators is arbitrarily selected upon demand and the kind of laser oscillators to be used together is not limited to those described hereinbefore. Further, although, in the described embodiment, the adjacent first laser beam transmission paths are connected to each other by a single second laser beam transmission path, it is possible to connect them by a plurality of second laser beam transmission paths.

Figure 5:
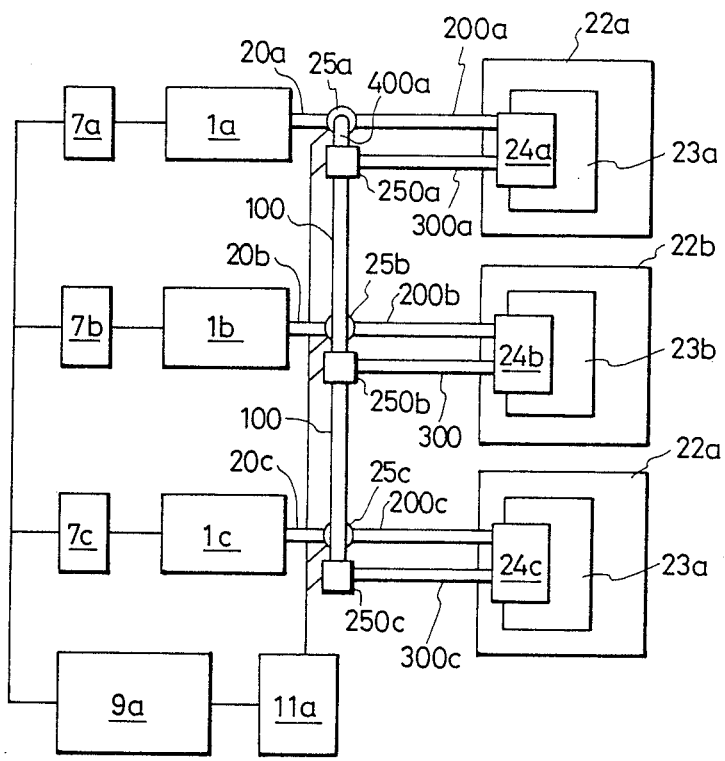
FIG. 5 shows a second embodiment of the present invention.

FIG. 5 shows another embodiment of the present invention in which same or corresponding elements as those shown in FIG. 2 are depicted by the same reference numerals, respectively, and so detailed descriptions thereof are omitted.

In FIG. 5, one ends of each of the second laser beam transmission paths 400a, 400b and 400c are connected to laser beam converters 25a, 25b and 25c provided in first laser beam transmission paths 20a, 200a, 20b, 200b and 20c, 200c extending from laser oscillators 1a, 1b and 1c to laser machining mechanisms 24a, 24b and 24c on machining tables 23a, 23b and 23c of machining stations 22a, 22b and 22c, respectively, as in the embodiment shown in FIG. 2. The other ends of the second laser beam transmission paths 400a, 400b and 400c are connected to laser beam branching devices 250a, 250b and 250c, between adjacent ones of which a common beam transmission path 100 is connected. The construction and function of the laser beam converter are the same as those shown in FIG. 2 and the beam branching device has the same construction as that of the laser beam converter. The beam branching devices 250a, 250b and 250c are connected to the machining mechanisms 24a, 24b and 24c through third laser beam transmission paths 300a, 300b and 300c, respectively.

The beam branching devices 250a, 250b and 250c are controlled by an optical path control device 11a which may be substantially the same as that shown in FIG. 2. In FIG. 5, components depicted by reference numerals 7a, 7b and 7c and 9a depict the same components as those shown in FIG. 2.

Figure 6:
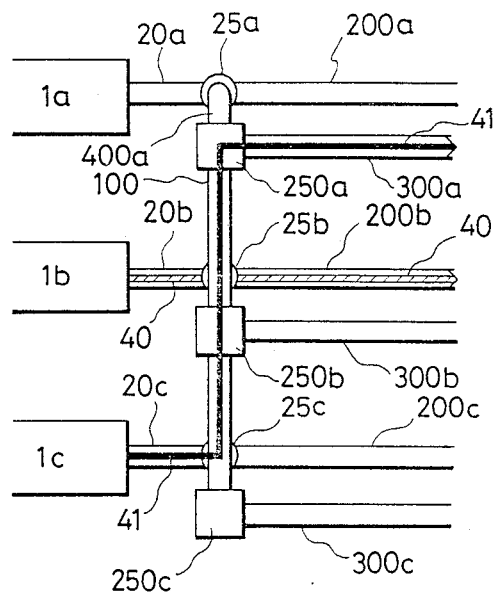
FIG. 6 illustrates an operation of the second embodiment in FIG. 5.

An operation of the embodiment shown in FIG. 5 will be described with reference to FIG. 6. In FIG. 6, the laser oscillators 1b and 1c are used and laser beam 40 from the laser oscillator 1b passes through the first transmission path 20b and 200b directly to the machining mechanism 24b. Laser beam 41 from the oscillator 1c passes through a first portion 20c of the first laser beam transmission path and is reflected by the laser beam converter 25c. After reflected, it passes through the second transmission path 400c, the common path 100 and the branching device 250b and is reflected by the branching device 250a. Then it passes through the third transmission path 300a to the machining mechanisms 24a. This passage of laser beam 41 is established under control of the optical control device 11a.

Thus, it becomes possible to machine a workpiece in the machining station 22a with laser beam 41 and another workpiece in the station 22b with laser beam 40.

Figure 7:
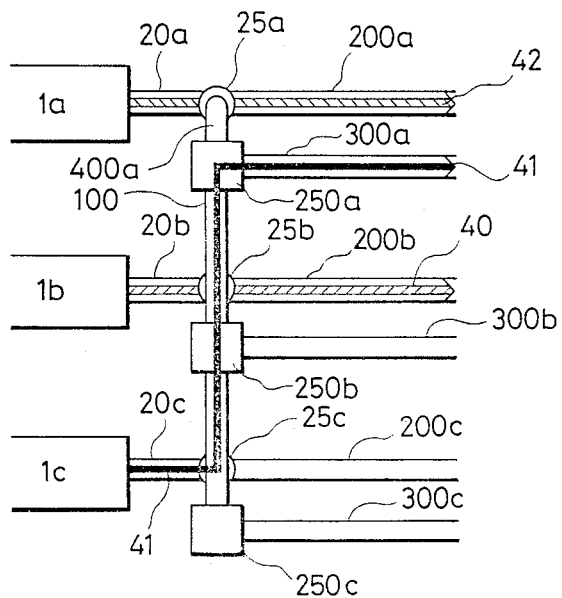
FIG. 7 illustrates another operation of the second embodiment.

When all of the laser oscillators are used under the same condition, as shown in FIG. 7, the workpiece in the station 22a can be machined with a combination of laser beams 41 and 42.

As is clear from the foregoing, according to the present invention, a first optical path between a laser oscillator and a machining station is connected to other first optical paths between other laser oscillators and other machining stations through second optical paths or through a common optical path and third optical paths so that, by suitably controlling the laser beam converters and/or laser beam branching devices, it is possible to select a desired laser beam or a desired combination of laser beams to machine a workpiece in a machining station in various manners and highly efficiently.

What is claimed is:

1. A laser machining apparatus for machining a workpiece by irradiating the workpiece with laser beams generated by a plurality of laser oscillators, said plurality of laser oscillators including $CO_2$ laser, a single mode $CO_2$ pulse laser, and a continuously excited Q switch YAG pulse laser, said apparatus comprising;
    a plurality of laser beam machining portions, each composed of one of said plurality of laser oscillators, a machining station and a first laser beam transmission path;
    a plurality of second laser beam transmission paths connecting adjacent ones of said first laser beam transmission paths; and
    a plurality of laser beam converters each provided in a junction between one of said first laser beam transmission paths and a respective one of said second laser beam transmission paths.

2. The laser machining apparatus as claimed in claim 1, wherein each said second laser beam transmission path is orthogonal to a respective one of said first laser beam transmission paths.

3. The laser machining apparatus as claimed in claim 2, wherein all of said laser beam transmission paths are coaxial with each other.

4. The laser machining apparatus as claimed in any of claims 1 to 3, wherein each said laser beam converter is a reflection mirror of gallium arsenide.

5. The laser machining apparatus as claimed in claim 4, further comprising a laser oscillator control device for controlling generation of laser beams and an optical path control device for controlling said laser beam converters to control optical paths for said laser beams.

6. A laser machining apparatus for machining a workpiece by irradiating the workpiece with laser beams generated by a plurality of laser oscillators, wherein said plurality of laser oscillators include a $CO_2$ laser, a single mode $CO_2$ pulse laser, and a continuously excited Q switch YAG pulse laser, said apparatus comprising:
    a plurality of laser beam machining portions, each composed of a laser oscillator, a machining station and a first laser beam transmission path connecting said laser oscillator and said machining station;
    a plurality of second laser beam transmission paths, each having one end connected to one of said first laser beam transmission paths;
    a plurality of common laser beam transmission paths, each extending orthogonally with respect to said first laser beam transmission paths and being connected to an adjacent pair of the other end of a respective one of said second laser beam transmission paths;
    a plurality of laser beam converters, each being provided in a junction between one of said first laser beam transmission paths and a respective one of said second laser beam transmission paths;
    a plurality of laser beam branching devices, each being disposed in a junction between one of said common laser beam transmission paths and a respective one of said second laser beam transmission paths; and
    a plurality of third laser beam transmission paths, each being disposed between one of said laser beam branching devices and a respective one of said machining stations.

7. The laser machining apparatus as claimed in claim 6, wherein said common laser beam transmission paths are coaxial.

8. The laser machining apparatus as claimed in claim 6 or 7, wherein said laser beam converter and said laser beam branching device comprise rotatable reflection mirrors of gallium arsenide, respectively.

9. The laser machining apparatus as claimed in claim 8, further comprising a laser oscillator control device for controlling laser beam generation and an optical path control device for controlling said laser beam converters to control optical paths therefor.

* * * * *